United States Patent [19]

Schouten

[11] Patent Number: 5,096,521

[45] Date of Patent: Mar. 17, 1992

[54] METHOD FOR MAKING A SELF-SUPPORTING FLEXIBLE HOSE, DEVICES FOR EFFECTING THIS METHOD AND SELF-SUPPORTING FLEXIBLE HOSE

[75] Inventor: Matheus J. W. Schouten, Deurne, Netherlands

[73] Assignee: Redeco AG, Netherlands

[21] Appl. No.: 372,872

[22] Filed: Jun. 28, 1989

[30] Foreign Application Priority Data

Jul. 5, 1988 [NL] Netherlands .......................... 8801702

[51] Int. Cl.⁵ .................... B31C 13/00; F16L 11/00
[52] U.S. Cl. .................... 156/143; 156/195; 138/134; 138/135; 138/136
[58] Field of Search .............. 138/124, 129, 134, 135, 138/136, 138, 150, 154; 156/195, 143; 29/744

[56] References Cited

U.S. PATENT DOCUMENTS

| | | | |
|---|---|---|---|
| 3,895,423 | 7/1975 | Arakelov et al. | 29/744 |
| 3,957,084 | 5/1976 | Jung | 138/136 X |
| 4,310,946 | 1/1982 | Baker et al. | 156/143 X |
| 4,330,356 | 5/1982 | Grollimund et al. | 156/446 |

FOREIGN PATENT DOCUMENTS

| | | |
|---|---|---|
| 129500 | 6/1900 | Fed. Rep. of Germany . |
| 1269774 | 7/1960 | France . |
| 1483914 | 4/1966 | France . |
| 2107500 | 5/1972 | France . |
| 40477 | 11/1936 | Netherlands . |
| 176203 | 2/1974 | Netherlands . |
| 22719 | of 1911 | United Kingdom . |

Primary Examiner—William A. Powell
Assistant Examiner—James J. Engel, Jr.
Attorney, Agent, or Firm—Ostrolenk, Faber, Gerb & Soffen

[57] ABSTRACT

Method for making a flexible hose with in cross section one flat side, and a spiral coil of a profiled strip with upright distant edges engaging with each other in adjacent windings in which said profiled strip is wound on a mandrel of suitable cross section and a discrete filling element is inserted into each of the respective hollow internal spaces of the wall during the winding of the profiled strip on the mandrel; device for carrying out this method and a flexible hose obtained by this method with discrete filling elements in the respective hollow spaces.

11 Claims, 7 Drawing Sheets

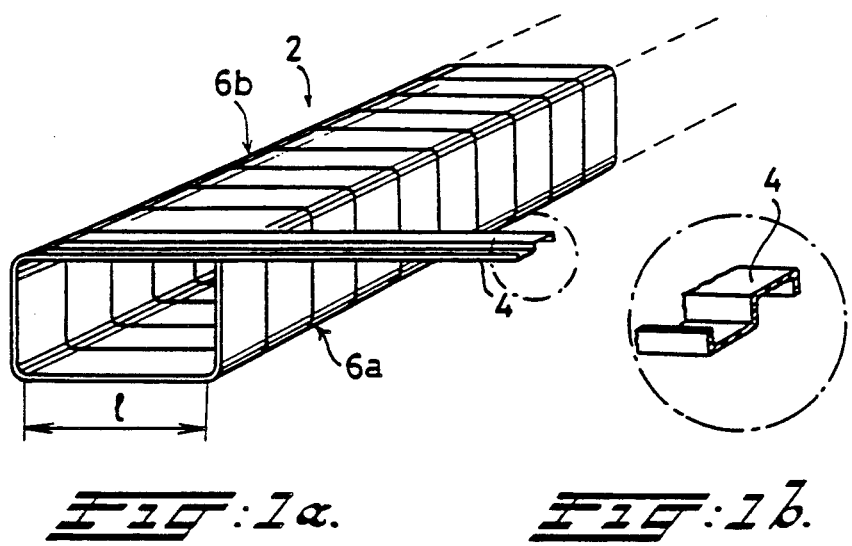
FIG:1a.   FIG:1b.
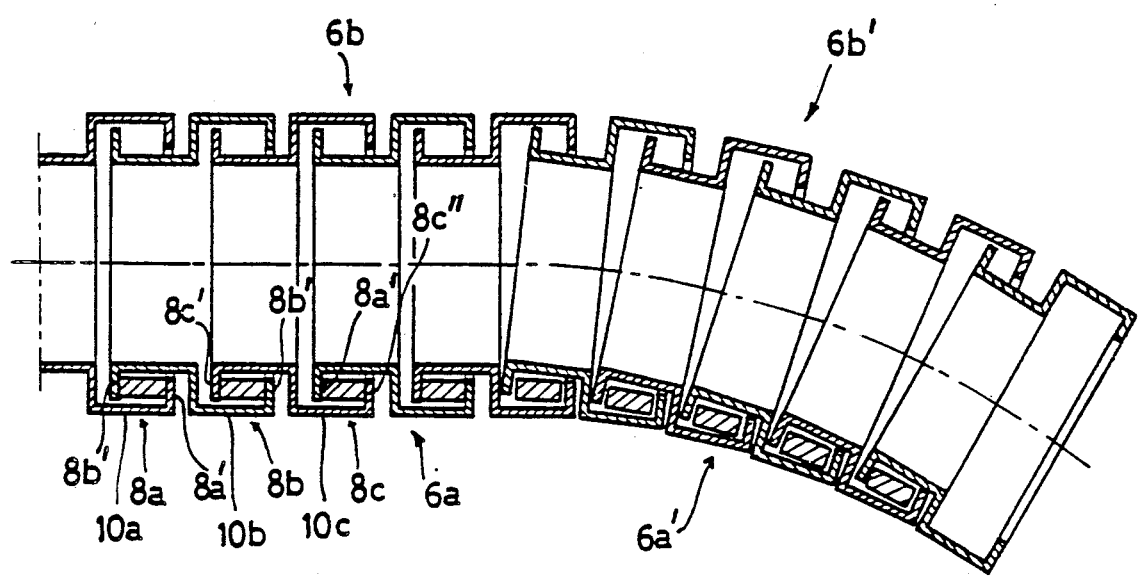
FIG:2.

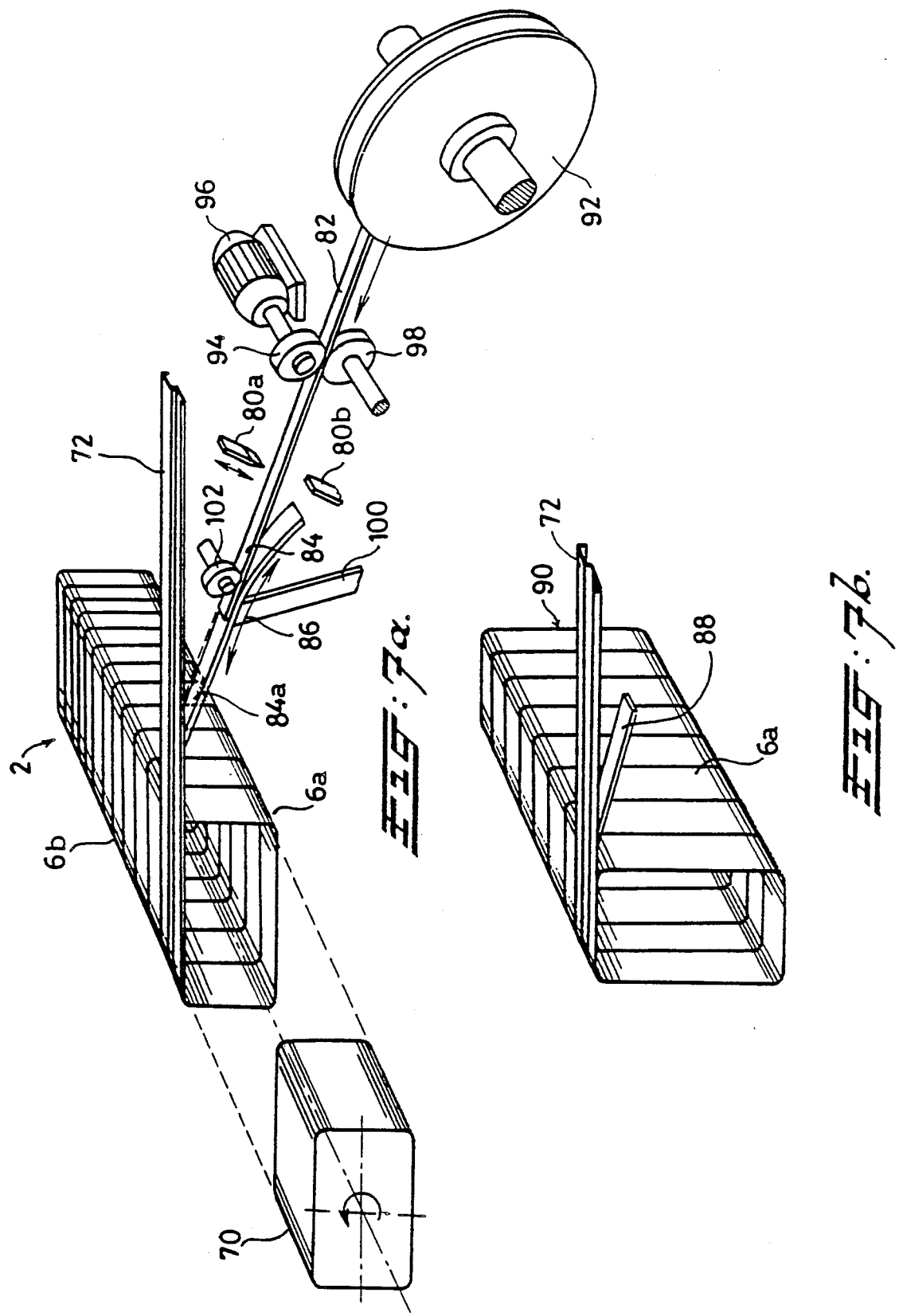

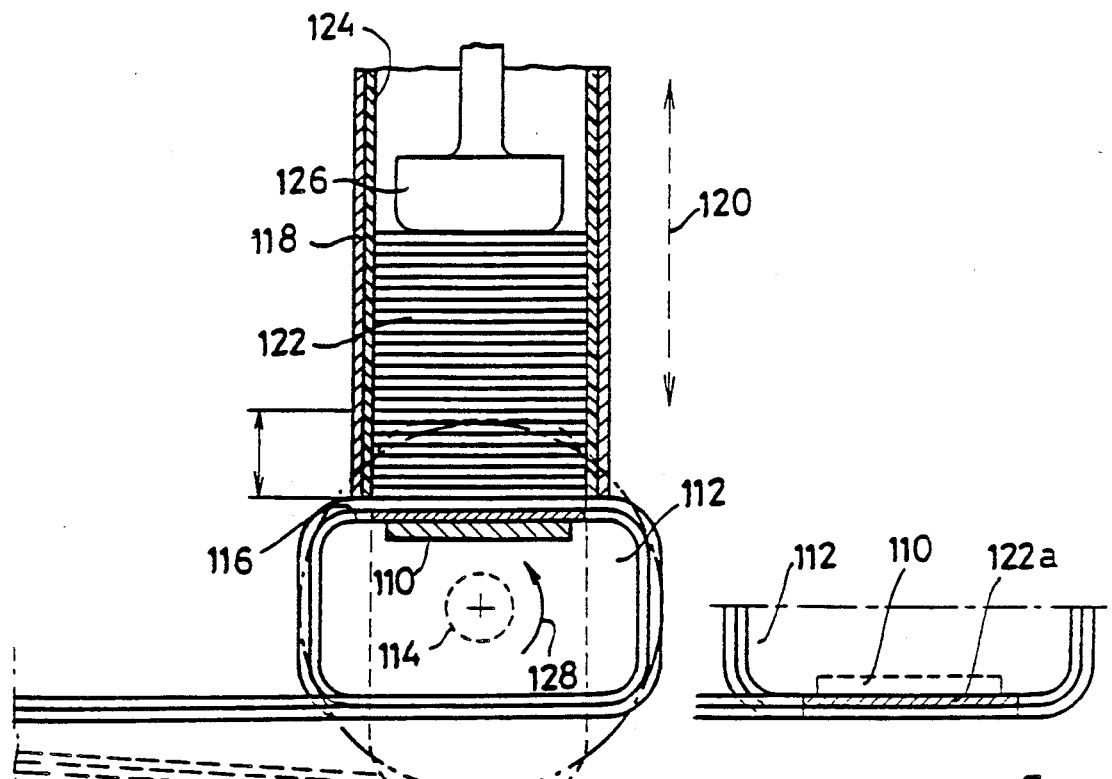
FIG: 8a.
FIG: 8b.
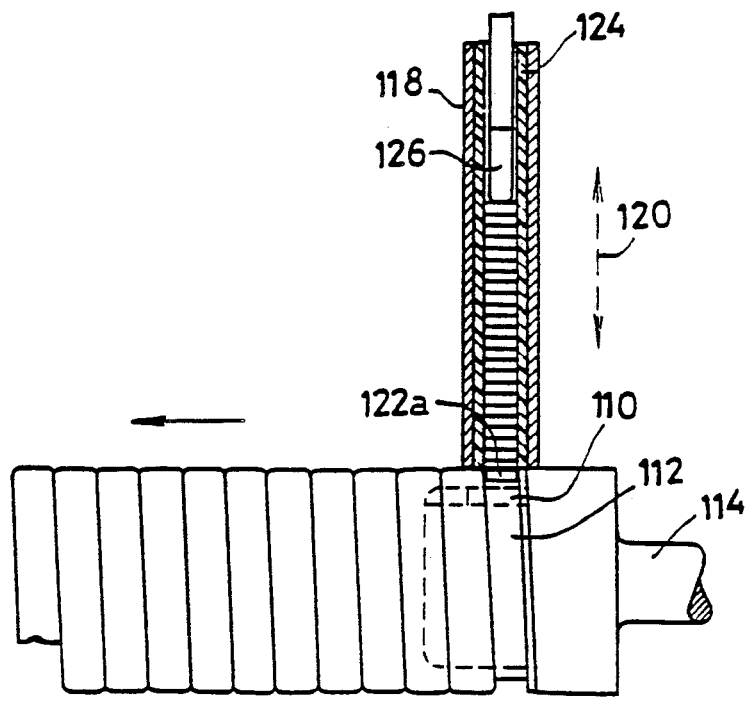
FIG: 8c.

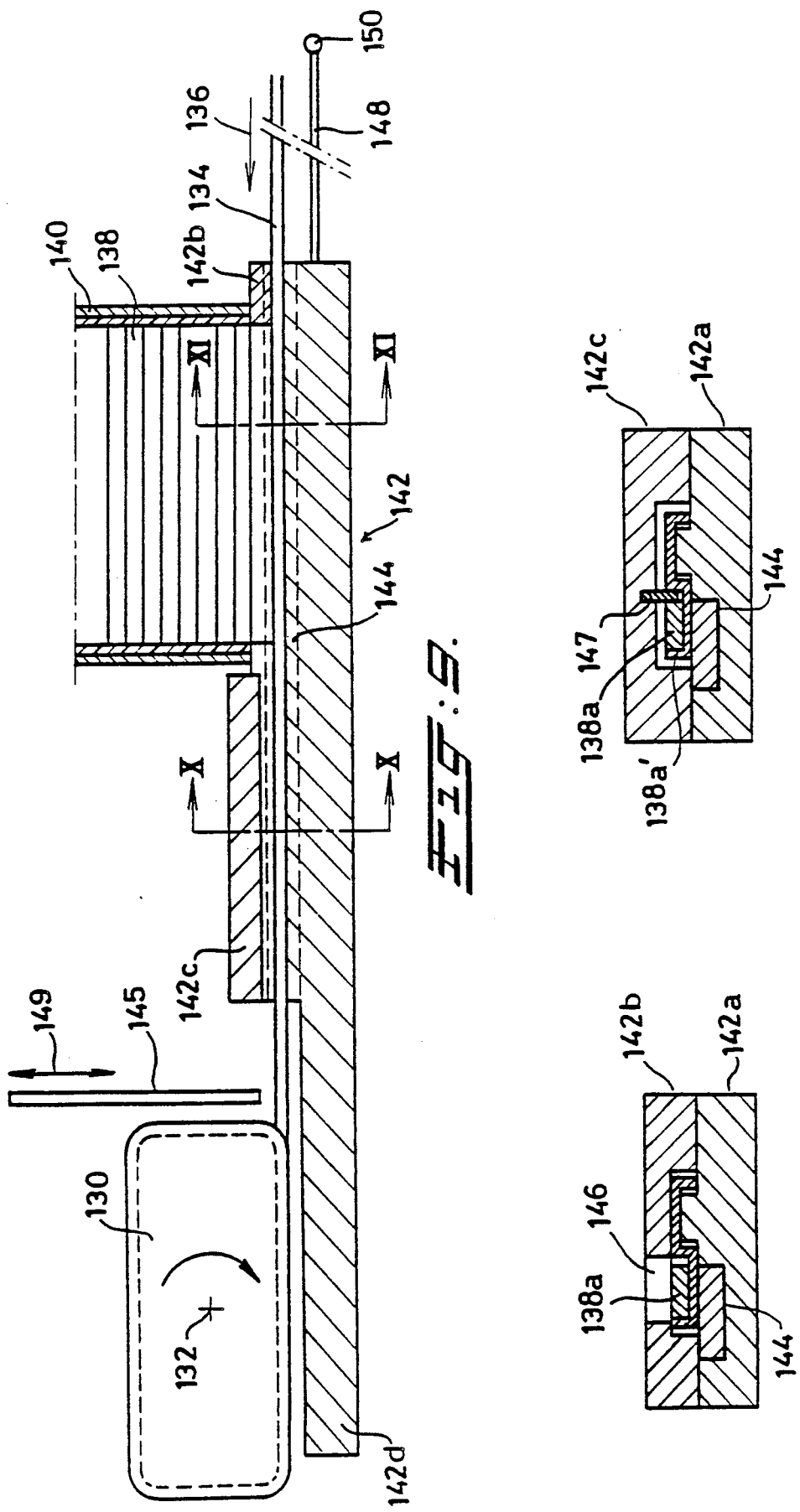

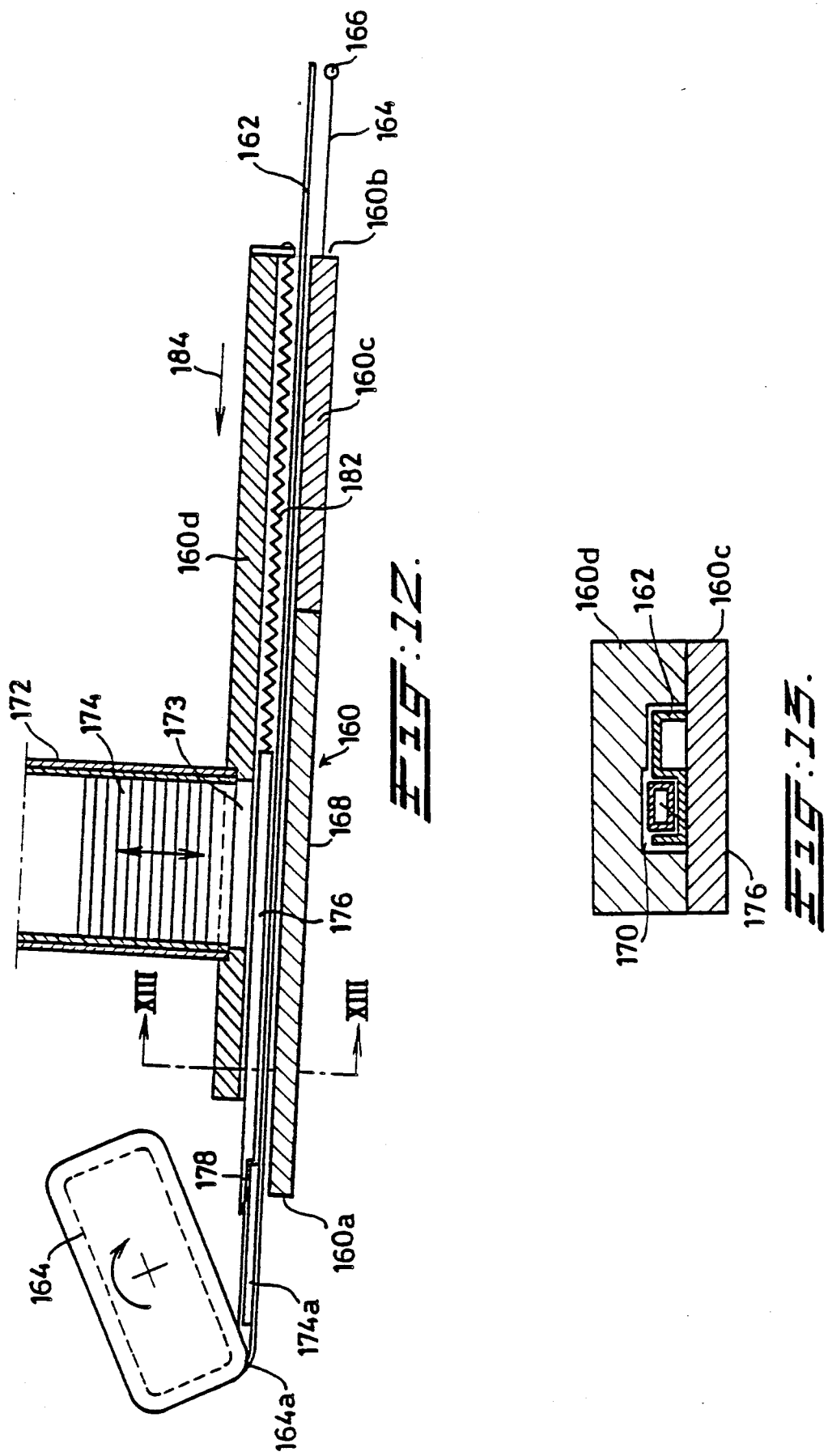

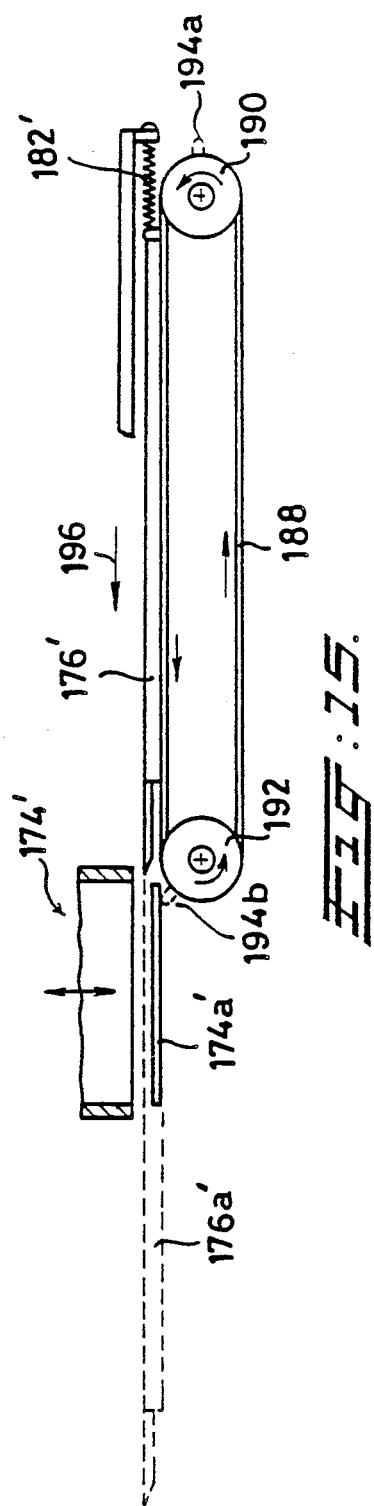
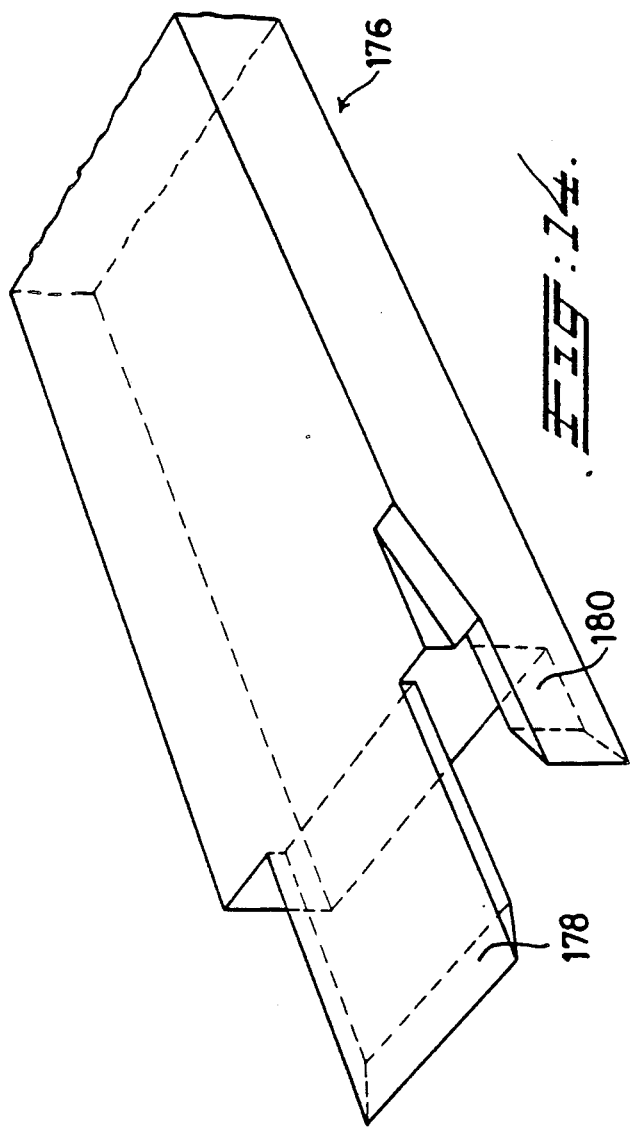

METHOD FOR MAKING A SELF-SUPPORTING FLEXIBLE HOSE, DEVICES FOR EFFECTING THIS METHOD AND SELF-SUPPORTING FLEXIBLE HOSE

BACKGROUND OF THE INVENTION

This invention relates to a method for making a flexible hose which has, in cross section, at least one essentially flat side, and comprises a spiral coil of at least one profiled strip with upright distant edges engaging with each other in adjacent windings, said method comprising introducing filling material on the flat side in the respective hollow internal spaces of the hose wall in the compressed state of the hose for limiting displacement of the winding on this side away from each other.

DESCRIPTION OF THE PRIOR ART

Such a method is known in itself from the German patent specification 2.919.379. This patent specification describes how, starting from an already existing flexible hose which is made up from a spiral coil of at least one profiled strip with interengaging distant upright edges in the adjacent windings openings are formed in the respective adjacent winding parts on one flat side of the hose, whereafter the hose is compressed and filling material is introduced through said openings into the respective hollow spaces. After the filling material has hardened the displacement of the windings on this side is limited.

These measures result into a kind of self-supporting quality which prevents sagging and is in particular a great advantage when the hose is used for guiding cables or pipes between a fixed point and an apparatus or device moving relative thereto, for instance a processing machine as the hose can be bent in only one direction. However, the manufacturing method as described above is very cumbersome, time-consuming and costly.

SUMMARY OF THE INVENTION

The invention aims to obviate these drawbacks. This is according to the invention obtained in that at least one profiled strip is wound on a mandrel of suitable cross section and at least one discrete filling element is inserted into each of said respective hollow internal spaced of the wall during the winding of the profiled strip on the mandrel.

The method according to the invention not only results in greatly reduced manufacturing costs as introducing the filling elements during the actual winding of the hose, and thus its manufacturing itself does not take more time than the manufacturing of the common hose, but has furthermore the advantage that one is entirely free in chosing the shape and the material of the filling elements, such as, for instance, a material which is resistant to acids, a humid atmosphere, oils, and high or low temperatures.

Another advantage is that there are no holes in the wall of the hose through which dirt or liquid might penetrate.

Preferably each of the filling elements to be introduced in said hollow spaced is made to adhere at the correct position on the moving profiled strip by means of a magnetic attracting force.

Alternatively each of the filling elements to be introduced in said hollow space is made to adhere at the correct position on the moving profiled strip by means of a suitable adhesive material, or by means of a deformation of a part of the profiled strip.

The invention also provides a flexible hose having in cross section at least one essentially flat side, and comprising a spiral coil of at least one profiled strip with upright distant edges engaging with each other in adjacent windings, and comprising on said flat hose side filling material in the respective hollow internal spaces of the hose for limiting displacement of the windings on this side away from each other, said filling material being present as discrete filling elements, introduced into the respective hollow spaces during the winding of the profiled strip on a mandrel.

Preferably one or both end faces of each filling element, directed towards said upright edges are convexedly curved. Alternatively the filling element can be oval in cross section.

In another embodiment the hose is made up by two profiled interengaging profiled strips, wound together, the first one with upright edges facing the interior of the hose and the second one with upright edges facing the outside of the hose.

A device according to the invention for effecting the method according to the invention comprises a rotatingly driven mandrel of suitable cross section and having a first and a second flat side adjacent to each other in the direction of a rotation comprising a magnet in the first flat side near the outer surface thereof, and feeding means positioned above said mandrel for placing a filling element between two adjacent upright edges of the profiled strip of that part of the strip which rests upon said first side.

Another device for carrying out the method according to the invention comprises a rotatingly driven mandrel of suitable cross section, and by an elongate guide for supporting and guiding the profiled strip towards the mandrel, extending with its one end to beneath the mandrel and being supported in such a way so as to be able to move up and down following the movement of the advancing strip, said guide comprising a flat supporting surface with a magnet embedded therein, housing means extending over part of the length of said guide for enclosing the profiled strip and feeding means for feeding filling elements to between two adjacent upright edges of the profiled strip resting upon said supporting face.

Still another device for carrying out the method according to the invention comprises a rotatingly driven mandrel of suitable cross section and by an elongate guide extending with its one end along the mandrel and being supported in such a way so as to be able to move up and down following the movement of the profile to be wound on the mandrel, said guide comprising reciprocating pushing means for controllable and periodically pushing a filling element, introduced between two adjacent upright edges of the profiled strip moving through said guide to underneath the mandrel. Said device can also comprise a controllable electromagnet placed along the surface of the guide which supports the strip, the pushing means being supported by said strip and adhering thereto when the electromagnet is energized.

DESCRIPTION OF THE DRAWINGS

FIG. 1a is a perspective view of a part of a hose of the type to which the invention relates;

FIG. 1b is a view on a larger scale of a detail from FIG. 1a;

FIG. 2 is a longitudinal section through such a hose provided with the discrete filling elements according to the invention, partly in the straight and partly in the bent state;

FIG. 7a and 7b are perspective schematic views of a device for effecting the method according to the invention;

FIG. 8a is a schematic end view, partly in cross section, of a second embodiment of such a device;

FIG. 8b shows a part of this embodiment;

FIG. 8c is a side view of this embodiment;

FIG. 9 is a side view, partly in cross section, of a third embodiment of a device for effecting the method according to the invention;

FIG. 10 is a cross section across the line X—X in FIG. 9;

FIG. 11 is a cross section across the line XI—XI in FIG. 9;

FIG. 12 is a cross section of a fourth embodiment of a device for effecting the method of the invention;

FIG. 13 is a cross section across the line XIII—XIII in FIG. 12;

FIG. 14 shows in perspective the pusher used in this embodiment;

FIG. 15 shows schematically another way for driving this pusher.

DESCRIPTION OF PREFERRED EMBODIMENTS

Figure 3:
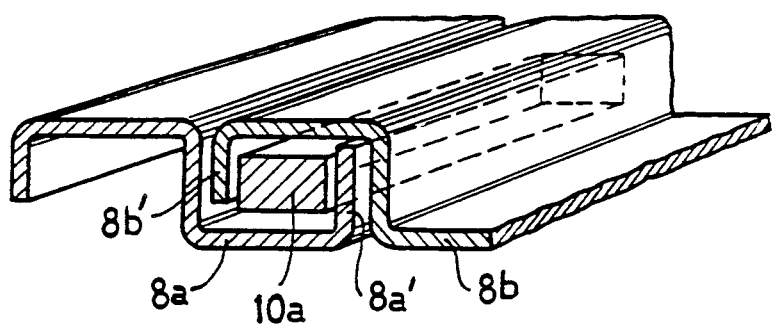
FIG. 3 is a perspective view of a part of two connecting coils separated by a discrete filling element according to the invention.

The hose 2, partly shown in FIG. 1a is of the known type. Such a hose is obtained by winding a double U-shaped, profiled strip 4 (see also FIG. 1b) in such a way that the upright edges of adjacent coils engage within each other. Such a hose can also be made by winding together two strips, both U-shaped, which engage with each other in the configuration shown in FIG. 6.

The hose thus obtained is rectangular in cross section, the longest side having the length 1. Of course, depending on the mandrel used for the winding, another polygonal configuration or a configuration with a straight and a curved side can also be obtained.

Such a hose is, when no special measures are taken, not self-supporting. The desired self-supporting property can be obtained by taking measures which ensure that at one flat side of the hose a displacement away from each other of the parts of the coils situated there is limited.

It is known to compress a completed hose of this type, to provide openings in the wall parts of the windings and to inject through these openings suitable material into the hollow spaces, as described in the German patent specification 2.919.379. This is, of course, a very cumbersome, time-consuming and costly operation. Furthermore there are limitations as to the material which can be used.

The invention, contrarily thereto, proposes to introduce discrete filling elements into the respective hollow spaces during the actual winding of the hose thus during the actual manufacturing thereof. This is not only much faster and cheaper but has also the very important advantage that the shape of the filling elements can be chosen at will.

In the left hand side of FIG. 2 three coils 8a, 8b, 8c are shown. A filling element 10a which has, in this embodiment a rectangular cross section, is disposed between the upright edge 8a' of the coil 8b; a filling element 10b is disposed in a similar manner between the upright edge 8c' of the coil 8c and the upright edge 8b'' of the coil 8b. The length of each filling element is at most equal to the length 1 of the bottom flat side 6, and the width of the filling elements is selected in such a way that the desired rigidity and self-supporting property are obtained. Of course it is also possible to fill-up the space with two or three filling elements, placed side by side; the following description will be based on the use of just one such element.

One is thus entirely free to choose a particular cross section configuration of the filling elements among the many possibilities. In many cases the hose will be bent frequently during use, for example when the hose is being used as a cablecarrier for a processing machine. In order to limit wear and energy consumption as much as possible, it is then important that the friction between the respective filling elements and the upright coil edges enclosing them should be as low as possible, a property which cannot be obtained with the known hose.

Figure 5A:
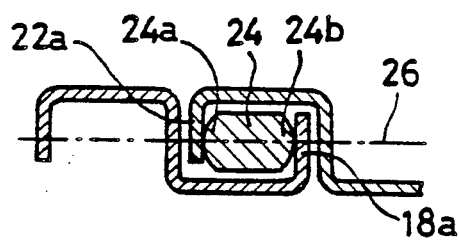
FIG. 5a is a cross section through a preferred embodiment of a filling element according to the invention.
Figure 5B:
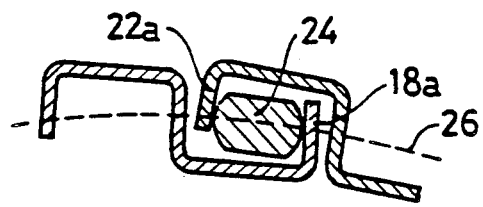
FIG. 5b shows the effect obtained by this configuration.

FIGS. 5a en 5b show filling elements 24 with two convex end edges 24a and 24b, which during the bending that takes place along the neutral line 26 co-operate in a rolling movement with the upright edges 18a and 22a respectively. The bending thus occurs along a neutral line 26 with consequently a minimum of friction and wear of the hose in combination with a minimal generation of noise, particularly during fast and frequent bending.

Figure 6:
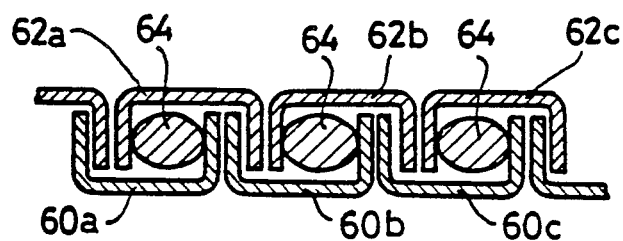
FIG. 6 shows a cross section through a second embodiment of a hose in which the filling elements can be used.

FIG. 6 shows a cross section of a hose which is obtained by winding not one, but two profiled intermeshing strips, a first strip with upright edges facing the interior of the hose by means of which the coils 60a, 60b, 60c are formed, and a second strip with upright edges facing the outside of the hose by means of which the coils 62a, 62b etc. adjoining these coils are formed. Here, too, discrete filling elements 64 with an essentially oval cross section are provided.

FIG. 7a and 7b show very schematically a device for effecting the method according to the invention.

The hose 2 is formed in the usual way by winding on a mandrel 70 the pre-fabricated profiled strip 72. The filling elements are cut off to the correct length from an infed length of material 82—which is drawn from the supply spool 92 by the roller 94, driven by the motor 96 and co-operating with the counter roller 98—by means of a cutting mechanism 80a, 80b, and are inserted as individual elements 84 via the position 84a indicated by dashed lines into the space between the upright edges by a schematically shown feed mechanism (100, 102) moving to and fro in the direction of the arrow 86.

FIG. 7b shows schematically how a discrete filling element can be introduced into the hose simultaneously with the winding of the profiled strip 72 which makes up this hose 90 and is always inserted at the correct place, namely at the flat side 6a. The winding mandrel is not shown in this drawing.

The material from which the filling elements are made can be selected depending on the expected load on the hose and the environment to be expected; a rigid plastic or a suitable metal are examples of feasible materials.

Of course there are various other ways of implementing the method according to the invention and a number of them will be described shortly with the use of schematic drawings.

Figure 4:
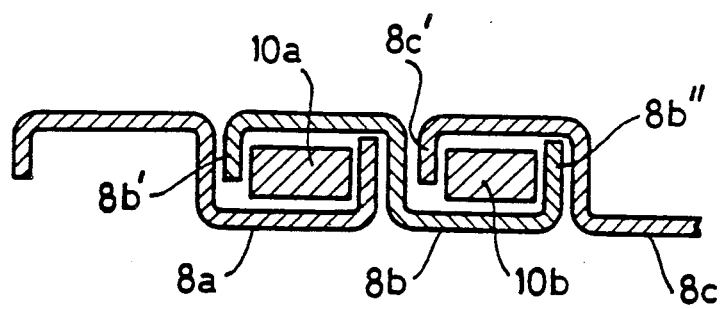
FIG. 4 is a cross section of these parts.

The FIGS. 8a, 8b and 8c relate to a device which uses a permanent magnetic part 110 embedded in the mandrel 112 used for winding the hose and rotatingly driven around the axis 114, by suitable, not shown, means. Of course the mandrel itself can be made of permanent magnetic material or, alternatively, the filling elements themselves can be permanent magnetic. A typical rotation speed is, for instance, one revolution every four seconds. The magnet ensures that a (metal) filling element, placed in the correct position in the profiled strip which is being wound remains in this position and is thus enclosed in the correct space in the hose. FIGS. 8a and 8c show schematically a holder 118 which is movable up and down by suitable, not shown, means, in the direction of the arrow 120, staying clear of the circumference of the mandrel and delivering in its downward stroke the lowest of the supply of filling elements, indicated with 122, into the profile. The holder 118 can, for instance, be provided with a liner 124 of foam rubber and with a pressure member 126 pressing down upon the stack of filling elements 122, during the downward stroke the lowest filling element 122a is pressed out of the holder. It adheres to the profiled strip due to the magnetic force of the magnet 110 and when the mandrel has turned over 180° in the direction of the arrow 128 it reaches the position of FIG. 8b in which it is enclosed in the correct hollow space at the one flat side of the hose, thus in the position as indicated in the FIGS. 2, 3 and 4. This principle of adhering a filling element by means of a magnetic force to the profiled strip—which, of course, implies that the filling element must be made of a suitable metal—is also used in the device according to the schematic FIGS. 9, 10 and 11. The mandrel, 130 rotates around the axis 132 and is driven by suitable, not shown, driving means. The profiled strip 134 advances, in the direction of the arrow 136 and during its movement towards the mandrel 130 filling elements 138, present in the holder 140—which is of the same construction as the holder 118 described in connection with FIGS. 8a–8c are periodically placed in this strip 134 and are advanced with this strip towards the front end 142d of the guide 142, thus between the strips and the mandrel. In this connection it is observed that the holder mechanism is just one of a number of possibilities to supply the filling elements: a gripper or a manipulator can be used instead. To keep them in their position the strip 134 is enclosed by an elongate guide 142 with a lower part 142a and an upper part 142b. Embedded in the lower part 142a is an elongate magnet 144 and the magnetic force of this magnet is sufficient to keep a filling element, such as the element 138a, deposited in the strip in its place. This holder 140 delivers the filling elements 138 through the opening 146 in the upper part 142b; the middle part 142c of said upper part contains a central guide strip 147 for guiding the filling element 138 towards the left hand edge 138a'. In this way it is prevented that an end edge of the strip contacts the filling element during the winding.

Of course means must be provided to ensure that the guide 142 can follow the up and down movement of the strip 134; the drawings show schematically an elongate spring blade 148, anchored at 150, supporting the guide 142 and providing for this movement.

It is possible to use a controlled barrier 145, moveable up and down in the direction of the arrow 149 to control the supply of the filling elements towards the mandrel 130 which simplifies the structure of the holder mechanism, particularly when part 142d is a permanent magnet.

When using a magnetic attracting force only metal strips can be handled. FIGS. 12–15 relate to embodiments which can handle filling elements of any material.

FIG. 12 shows an elongate guide 160, corresponding with the guide 142 described above and thus also enclosing the advancing strip 162 and extending with its front end 160a to beneath the mandrel 164; the other end 160b is anchored by means of the spring blade 164 to the fixed point 166. A schematically shown electromagnet 168 is enclosed in the lower part 160c; it can be energized periodically by means of suitable energizing and switching means (not shown). The upper part 160d is provided with a suitable cut-out 170 within which fits the advancing profiled strip 162. The holder 172, constructed and actuated in a similar way as the holders 118 and 140, described above, contains filling elements 174 which are deposited one by one into the strip. They are then pushed forwardly by an elongate pusher 176 which is shown in perspective in FIG. 14. This pusher is made up from a suitable (magnetizable) metal and comprises a front blade 178 destined to overlie the filling element which is to be pushed forwardly and a side blade 180 destined to push against the side of this filling element. The pusher 176 is coupled by means of a spiral spring 182 to the end 160b of the guide.

Initially this pusher 176 is drawn by the spring 182 to the right hand end of the guide 160. When the holder 172 delivers a filling element in the open space 173 of the upper part 160d the electromagnet 168 is energized so that the pusher 176 is pressed against the bottom of the profiled strip 162 and moves with it in the direction of the arrow 184, thus towards the mandrel 164.

FIG. 12 shows the situation in which the pusher 176 has pushed the filling element 174a to just into the corner 164a of the mandrel 164 so that it is securely gripped; at that moment suitable control means ensure that the current to the magnet 168 is switched-off so that the pusher 176 is not attracted anymore against the surface of the strip 162 and pulled back by the spring 182. The strip 174a, however, remains into place and is wound into the correct place of the hose which is being formed on the mandrel 164.

FIG. 15 shows schematically another way of driving the pusher 176' which is here shown in its retracted position, pulled back by the spring 182'; the holder 174' is shown having just delivered a filling element 174a'. A belt 188, guided over the guide wheels 190 and 192 and driven by suitable, not shown, driving means comprises cams 194a, 194b which push the pusher 176' in the direction of the arrow 196 into the position 176a' shown with broken lines; then the cam 194b becomes free of the pusher 176' which is then pulled back into the shown position by the spring 182'.

Two other possibilities for adhering the filling elements to the advancing strip are: using a suitable adhesive material and deforming the wall of the strip at suitable intervals, thus in front of and behind the strip.

It is clear that in the foregoing only the principles on which various devices for implementing the method according to the invention are described and that such devices need many more components for controlling the various movements and actions which lie within reach of the expert having knowledge of the great number of available actuators and control systems; it is, for instance, perfectly feasible to have the various actions controlled by a central microprocessor.

What is claimed is:

1. A method for making a flexible hose which has, in cross section, at least one essentially flat side, and comprises a spiral coil of at least one profiled strip with upright distant edges engaging with each other in adjacent windings, said method comprising introducing filling material on the flat side in the respective hollow internal spaces corresponding to the sidewall dimensions of the hose wall between the upright edges of successive windings adjoining said flat side in the compressed state of the hose for limiting displacement of the windings on this side away from each other, at least one profiled strip being wound on a mandrel of suitable cross section and at least one discrete filling element being inserted into each of said respective hollow internal spaces of the wall during the winding of the profiled strip on the mandrel such that said filling element is completely enclosed by said hose wall.

2. A method according to claim 1 in which each of the filling elements to be introduced in said hollow spaces is made to adhere at the correct position on the moving profiled strip by means of a magnetic attracting force.

3. A method according to claim 2 in which the attracting magnetic force is provided by the mandrel comprising magnetic material.

4. A method according to claim 2 in which the attracting magnetic force is provided by a magnet placed along the strip of profiled material advancing to the mandrel.

5. A method according to claim 1 in which each of the separate filling elements to be introduced in each of said hollow spaces is advanced towards the rotating mandrel over the surface of the advancing strip until its front end reaches the corner of the hollow space to be formed by means of a pressure member advancing periodically, starting from an initial position, towards said mandrel and returning to said initial position after the filling element has been delivered.

6. A method according to claim 1 in which each of the filling elements to be introduced in said hollow space is made to adhere at the correct position on the moving profiled strip by means of a suitable adhesive material.

7. A method according to claim 1, in which each of the filling elements to be introduced in said hollow space is made to adhere at the correct position on the moving profiled strip by means of a deformation of a part of the profiled strip.

8. A method according to claim 1 in which each of said filling elements to be introduced in each of said hollow spaced is advanced towards the rotating mandrel until its front end reaches the corner of the hollow space to be formed by means which support and guide said element from beneath the advancing strip.

9. A method according to claim 1, in which each filling element is introduced so as to be freely movable within its respective hollow internal space.

10. A method according to claim 9, in which each filling element has opposed, convexly curved end faces and is introduced into its respective hollow internal space such that the opposed end faces are directed towards said upright edges defining said hollow internal space.

11. A method according to claim 9, in which each filling element is oval in cross section, has opposed curved end surfaces and is introduced into its respective hollow space such that the opposed end faces are directed towards said upright edges defining said hollow internal space.

* * * * *